(12) United States Patent
Akatsuka et al.

(10) Patent No.: US 7,057,614 B2
(45) Date of Patent: Jun. 6, 2006

(54) INFORMATION DISPLAY SYSTEM AND PORTABLE INFORMATION TERMINAL

(75) Inventors: Yuichiro Akatsuka, Tama (JP); Takao Shibasaki, Tokyo (JP); Takeo Asano, Kunitachi (JP)

(73) Assignee: Olympus Corporation, Tokyo (JP)

( * ) Notice: Subject to any disclaimer, the term of this patent is extended or adjusted under 35 U.S.C. 154(b) by 396 days.

(21) Appl. No.: 10/443,927

(22) Filed: May 22, 2003

(65) Prior Publication Data

US 2004/0055794 A1    Mar. 25, 2004

(30) Foreign Application Priority Data

May 24, 2002    (JP)    ............................. 2002-151160

(51) Int. Cl.
*G06T 15/00*    (2006.01)
(52) U.S. Cl. ...................... 345/427; 345/629; 348/113
(58) Field of Classification Search ................ 345/427, 345/582, 629, 630; 382/100; 348/113
See application file for complete search history.

(56) References Cited

U.S. PATENT DOCUMENTS 6,222,583 B1    4/2001    Matsumura et al. ........ 348/113

| 6,577,249 | B1  |        | 6/2003 | Akatsuka et al. ............ 340/988 |
| 6,759,979 | B1* | 7/2004 | Vashisth et al. ....... 342/357.13 |
| 6,912,293 | B1* | 6/2005 | Korobkin ..................... 382/100 |
| 6,927,777 | B1* | 8/2005 | Kitsutaka .................... 345/582 |

FOREIGN PATENT DOCUMENTS

| JP | 2001-118187 | 4/2001 |
| JP | 2001-126021 | 5/2001 |
| JP | 2001-126051 | 5/2001 |

* cited by examiner

*Primary Examiner*—Phu K. Nguyen
(74) *Attorney, Agent, or Firm*—Scully, Scott, Murphy & Presser, P.C.

(57) ABSTRACT

A position information management unit estimates position/orientation information, in an object coordinate system, of an image input unit configured to inputs an image, from the image input by the image input unit. A dynamic deformation control unit dynamically controls the deformation of three-dimensional model data arranged in the object coordinate system. A two-dimensional projection image generating unit generates two-dimensional projection image data, in a view field of the image input unit, of the three-dimensional model data deformation-controlled by the dynamic deformation control unit, based on the position/orientation information of the image input unit estimated by the position information management unit. A superposed display unit displays the two-dimensional projection image data generated by the two-dimensional projection image-generating unit, in superposed relation with the image input by the image input unit.

34 Claims, 2 Drawing Sheets

INFORMATION DISPLAY SYSTEM AND PORTABLE INFORMATION TERMINAL

CROSS-REFERENCE TO RELATED APPLICATIONS

This application is based upon and claims the benefit of priority from the prior Japanese Patent Application No. 2002-151160, filed May 24, 2002, the entire contents of which are incorporated herein by reference.

BACKGROUND OF THE INVENTION

1. Field of the Invention

The present invention relates to an information display system for displaying information related to an object in an image, and a portable information terminal for use in such an information display system.

2. Description of the Related Art

As seen in the broadcasting programs, it has been a common practice to display a computer graphic (CG) image, a telop or the like in superposed relation with an actual video image using a technique such as a chroma key. An image sequence such as an animation is also displayed in superposed fashion. A system for realizing this operation is configured of image input means (camera), means for reproducing a CG or animation, and image superposition means (chroma key or the like). This system makes it possible to display additional information on an actual image.

Also, Jpn. Pat. Appln. KOKAI Publication No. 2001-126051 discloses an apparatus, for example, for displaying the related information in accordance with a view point of the image input means. This apparatus comprises image input means, position/orientation detection means for detecting the position and orientation of the image input means, search and extraction means for searching and extracting information related to a view field of the image input means, and superposed display means for displaying by superposition the input image obtained from the image input means and the related information obtained by the search-extraction means. This configuration makes it possible to display the information in accordance with the view field of the image input means.

Further, a landscape labeling apparatus and system are disclosed in U.S. Pat. No. 6,222,583, for example, in which information related to an image from image input means is displayed. In this system, an approximate position of image input means (image acquisition unit) is acquired from a position information acquisition unit and an angle is acquired from a camera attribute information acquisition unit. A vista image of a view field visible from a particular position is produced in CG based on three-dimensional map information and pattern-matched with the input image thereby to determine the related information superposed.

Also, a method of determining the position and orientation of image input means from a reference mark position is disclosed in "A High Accuracy Realtime 3D Measuring Method of Marker for VR Interface by Monocular Vision", 3D Image Conference '96, pp. 67–172, by Akira Takahashi, Ikuo Ishii, Hideo Makino, and Makoto Nakashizuka. Specifically, in FIG. 1, assume that $O_c$ is a view point, $p_0$ is an intersection of projected image diagonals and $P_0$ is an intersection of rectangular diagonals, the orientation can be determined by acquiring x' minimizing $$F(x') = 4 - \sum_{i=1}^{4} (n_i n'_i)^2$$

where the variable vector x' is given as $$x' = (\alpha_1', \beta_1', \alpha_2')$$

With regard to a position of image pickup means, on the other hand, a value d minimizing a distance from $O_{cpi}$ to the apex $P_i$ is estimated by the least-square method.

$$d = \frac{(s_0 s_i)(s_i w_i) - (s_0 w_i)}{1 - (s_0 s_i)^2} D$$

Then, the position can be determined from an average of a depth value determined from each apex.

BRIEF SUMMARY OF THE INVENTION

According to a first aspect of the present invention, there is provided an information display system comprising:

an image input unit configured to input an image;

a position information management unit configured to estimate position/orientation information of the image input unit in an object coordinate system, from the image input by the image input unit;

a three-dimensional model data arranged in the object coordinate system;

a dynamic deformation control unit configured to dynamically control the deformation of the three-dimensional model data;

a two-dimensional projection image generating unit configured to generate, based on the position/orientation information of the image input unit estimated by the position information management unit, a two-dimensional projection image data in a view field of the image input unit for the three-dimensional model data deformation-controlled by the dynamic deformation control unit; and a superposed display unit configured to display, in superposed relation with the input image from the image input unit, the two-dimensional projection image data generated by the two-dimensional projection image generating unit.

According to a second aspect of the present invention, there is provided a portable information terminal comprising:

an image input unit configured to input an image and transmit the input image to a server;

a superposed display unit configured to receive from the server two-dimensional projection image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on position/orientation information of the image input unit in the object coordinate system estimated from the image input by the image input unit.

According to a third aspect of the present invention, there is provided a portable information terminal comprising:

an image input unit configured to input an image;

a marker detection unit configured to detect a known marker existing in an image input by the image input unit and transmit a part of the image corresponding to the detected known marker in the input image to a server; and a superposed display unit configured to receive from the server two-dimensional projection image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on position/orientation information of the image input unit in the object coordinate system estimated from the image transmitted by the marker detection unit.

According to a fourth aspect of the present invention, there is provided a portable information terminal comprising:

an image input unit configured to input an image;

a position information management unit configured to estimate position/orientation information of the image input unit in an object coordinate system from the image input by the image input unit, and to transmit the estimated position/orientation information to a server; and a superposed display unit configured to receive from the server two-dimensional image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on the position/orientation information transmitted by the position information management unit.

According to a fifth aspect of the present invention, there is provided a portable information terminal comprising:

an image input unit configured to input an image;

a position information management unit configured to estimate position/orientation information of the image input unit in an object coordinate system from the image input by the image input unit;

a two-dimensional projection image generating unit configured to receive from a server three-dimensional model data resulting from the dynamic deformation control of three-dimensional model data arranged in the object coordinate system, and to generate two-dimensional projection image data of the received three-dimensional model data in a view field of the image input unit, based on the position/orientation information of the image input unit estimated by the position information management unit; and a superposed display unit configured to display the two-dimensional projection image data generated by the two-dimensional projection image generating unit, in superposed relation with the image input by the image input unit.

According to a sixth aspect of the present invention, there is provided a portable information terminal comprising:

an image input unit configured to input an image;

a position information management unit configured to estimate position/orientation information of the image input unit in an object coordinate system from the image input by the image input unit;

three-dimensional model data arranged in the object coordinate system;

a two-dimensional projection image generating unit configured to receive from a server deformation control information for controlling the deformation of the three-dimensional model data dynamically, and to generate two-dimensional projection image data, in a view field of the image input unit, of the three-dimensional model data deformation-controlled in accordance with the deformation control information, based on the position/orientation information of the image input unit estimated by the position information management unit; and a superposed display unit configured to display the two-dimensional projection image data generated by the two-dimensional projection image generating unit, in superposed relation with the image input by the image input unit.

According to a seventh aspect of the present invention, there is provided a portable information terminal comprising:

an image input unit configured to input an image;

a position information management unit configured to estimate position/orientation information of the image input unit in an object coordinate system from the image input by the image input unit;

three-dimensional model data arranged in the object coordinate system;

a dynamic deformation control unit configured to control the deformation of the three-dimensional model data dynamically;

a two-dimensional projection image generating unit configured to generate two-dimensional projection image data, in a view field of the image input unit, of the three-dimensional model data deformation-controlled by the dynamic deformation control unit, based on the position/orientation information of the image input unit estimated by the position information management unit; and a superposed display unit configured to display the two-dimensional projection image data generated by the two-dimensional projection image generating unit, in superposed relation with the image input by the image input unit.

According to an eighth aspect of the present invention, there is provided an information display system comprising:

an image input unit configured to input an image;

a position information management unit configured to estimate position/orientation information of the image input unit in an object coordinate system from the image input by the image input unit;

a two-dimensional projection image storage unit configured to store dynamic two-dimensional projection image data from a plurality of view points prepared in advance;

a two-dimensional projection image selection unit configured to select the dynamic two-dimensional projection image data stored in the dynamic two-dimensional projection image storage unit, based on the position/orientation information of the image input unit estimated by the position information management unit; and a superposed display unit configured to display the dynamic two-dimensional projection image data selected by the two-dimensional projection image selection unit, in superposed relation with the image input by the image input unit.

According to a ninth aspect of the present invention, there is provided a portable information terminal comprising:

an image input unit configured to input an image and transmit the input image to a server; and a superposed display unit configured to receive from the sever dynamic two-dimensional projection image data and display the dynamic two-dimensional projection image data in superposed relation with the image input by the image input unit, the dynamic two-dimensional projection image data being selected based on position/orientation information of the image input unit in an object coordinate system estimated from the input image among dynamic two-dimensional projection image data from a plurality of view points prepared in advance.

According to a tenth aspect of the present invention, there is provided a portable information terminal comprising:

an image input unit configured to input an image;

a marker detection unit configured to detect a known marker existing in an image input by the image input unit and transmit to a server a part of the image corresponding to the detected known marker in the input image; and a superposed display unit configured to receive from the sever dynamic two-dimensional projection image data and display the dynamic two-dimensional projection image data in superposed relation with the image input by the image input unit, the dynamic two-dimensional projection image data being selected based on position/orientation information of the image input unit in an object coordinate system estimated from the image transmitted by the marker detection unit among dynamic two-dimensional projection image data from a plurality of view points prepared in advance.

According to a eleventh aspect of the present invention, there is provided a portable information terminal comprising:

an image input unit configured to input an image;

a position information management unit configured to estimate position/orientation information of the image input unit in an object coordinate system from the image input by the image input unit, and to transmit the estimated position/orientation information to a server; and a superposed display unit configured to receive from the sever dynamic two-dimensional projection image data and display the dynamic two-dimensional projection image data in superposed relation with the image input by the image input unit, the dynamic two-dimensional projection image data being selected based on the position/orientation information transmitted from the position information management unit among dynamic two-dimensional projection image data from a plurality of view points prepared in advance.

According to a twelfth aspect of the present invention, there is provided a portable information terminal comprising:

an image input unit configured to input an image;

a position information management unit configured to estimate position/orientation information of the image input unit in an object coordinate system from the image input by the image input unit;

a two-dimensional projection image selection unit configured to communicate with a server and select one of dynamic two-dimensional projection image data from a plurality of view points prepared in advance and stored in the server, based on the position/orientation information of the image input unit estimated by the position information management unit; and a superposed display unit configured to display the dynamic two-dimensional projection image data selected by the two-dimensional projection image selection unit, in superposed relation with the image input by the image input unit.

According to a thirteenth aspect of the present invention, there is provided a portable information terminal comprising:

an image input unit configured to input an image;

a position information management unit configured to estimate position/orientation information of the image input unit in an object coordinate system from the image input by the image input unit;

a dynamic two-dimensional projection image storage unit configured to store dynamic two-dimensional projection image data from a plurality of view points prepared in advance;

a two-dimensional projection image selection unit configured to select the dynamic two-dimensional projection image data stored in the dynamic two-dimensional projection image storage unit, based on the position/orientation information of the image input unit estimated by the position information management unit; and a superposed display unit configured to display the dynamic two-dimensional projection image data selected by the two-dimensional projection image selection unit, in superposed relation with the image input by the image input unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below with reference to the drawings.

FIRST EMBODIMENT

Figure 1:
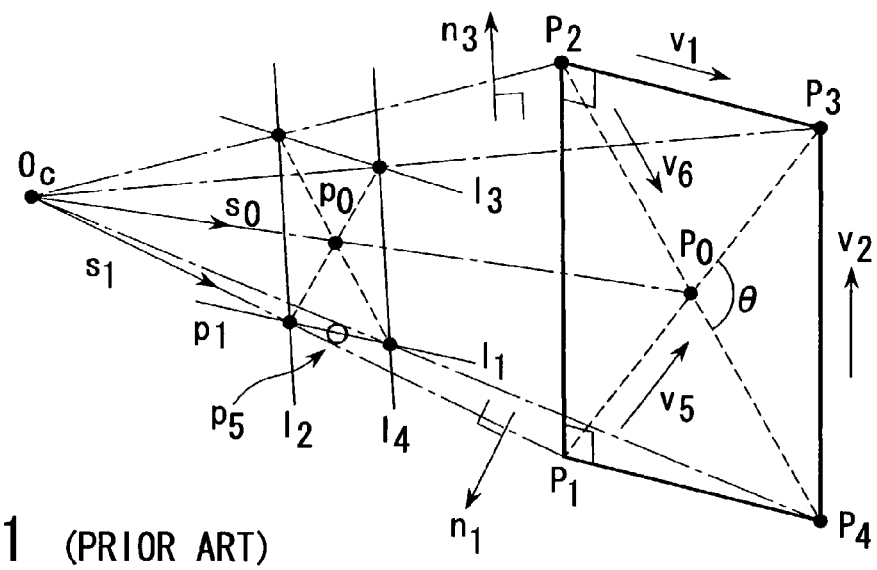
FIG. 1 is a diagram for explaining a method of determining the position and orientation of image input means from a reference marker position according to the prior art.
Figure 2:
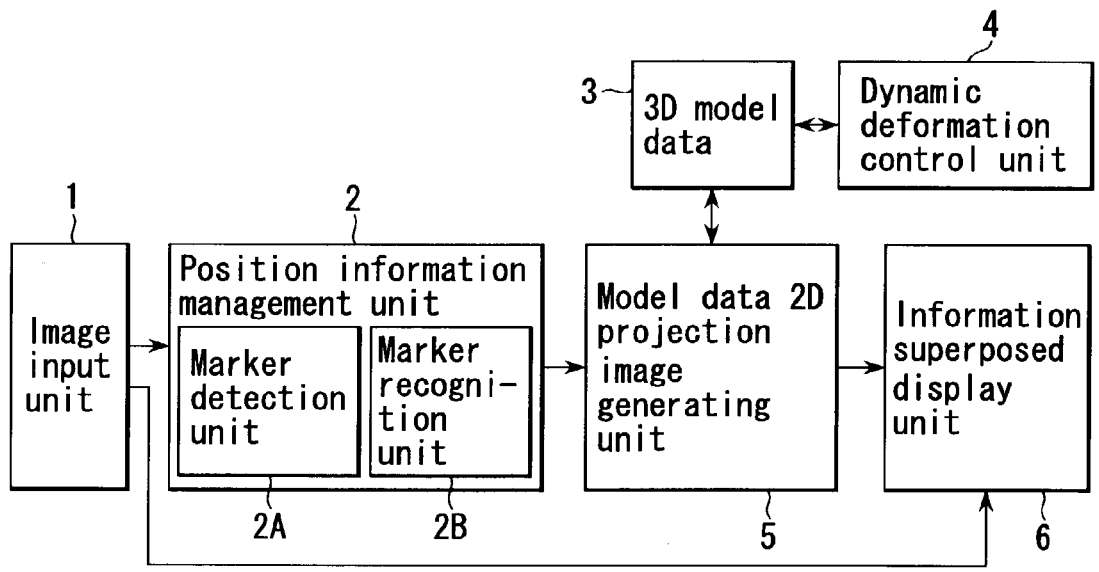
FIG. 2 is a block diagram showing a configuration of an information display system according to a first embodiment of the invention.

As shown in FIG. 2, an information display system according to a first embodiment of the invention comprises an image input unit 1, a position information management unit 2, three-dimensional model data 3, a dynamic deformation control unit 4, a model data two-dimensional projection image generating unit 5 and an information superposed display unit 6.

The image input unit 1 is a camera for inputting an image therein. The position information management unit 2 estimates position/orientation information of the image input unit 1 in an object coordinate system from the image input by the image input unit 1. The position information management unit 2 includes a marker detection unit 2A and a marker recognition unit 2B. The marker detection unit 2A detects a known marker existing in the image input by the image input unit 1. The marker recognition unit 2B functions as a relative positions/orientations calculation unit for calculating the relative positions/orientations between the known marker detected by the marker detection unit 2A and the image input unit 1 and thus estimating the position/orientation information of the image input unit 1 in the object coordinate system. A method of marker detection by the marker detection unit 2A and a method of estimating the position/orientation information by the marker recognition unit 2B are disclosed in Jpn. Pat. Appln. KOKAI Publications No. 2001-118187 and No. 2001-126051, and will not be described again.

The three-dimensional model data 3 is arranged in the object coordinate system. The dynamic deformation control unit 4 dynamically controls the deformation of the three-dimensional model data 3. The model data two-dimensional projection image generating unit 5 generates two-dimensional projection image data in a view field of the image input unit 1, of the three-dimensional model data deformation-controlled by the dynamic deformation control unit 4 based on the position/orientation information of the image input unit 1 estimated by the position information management unit 2. The information superposed display unit 6 displays the two-dimensional projection image data by superposing the two-dimensional projection image data generated by the model data two-dimensional projection image generating unit 5, on the input image from the image input unit 1.

Next, the operation of an information reproduction system having the above-mentioned configuration will be explained. The image input by the image input unit 1 is analyzed by the position information management unit 2 thereby to estimate the position/orientation of the image input unit 1 in the object coordinate system. The position/orientation information thus estimated is supplied to the model data two-dimensional projection image generating unit 5. The model data two-dimensional projection image generating unit 5 converts an object in the object coordinate system into a view field coordinate of the image input unit 1 with the position/orientation information as a view point thereby to produce two-dimensional projection image. An object is referred to as the three-dimensional model data 3. The two-dimensional projection image generated in the model data two-dimensional projection image generating unit 5 and the image from the image input unit 1 are displayed in superposed relation with each other in the information superposed display unit 6.

In the process, the three-dimensional model data 3 is not static information, but changes dynamically along the time axis, for example. This change is controlled by the dynamic deformation control unit 4. According to the first embodiment, the time begins to flow and the model begins to be deformed at the time point when at least a part of the three-dimensional model data 3 enters the view field of the view field coordinate of the image input unit 1. The deformation of the model is defined as a partial change of the shape of a 3D model described in VRML, for example.

Figure 3:
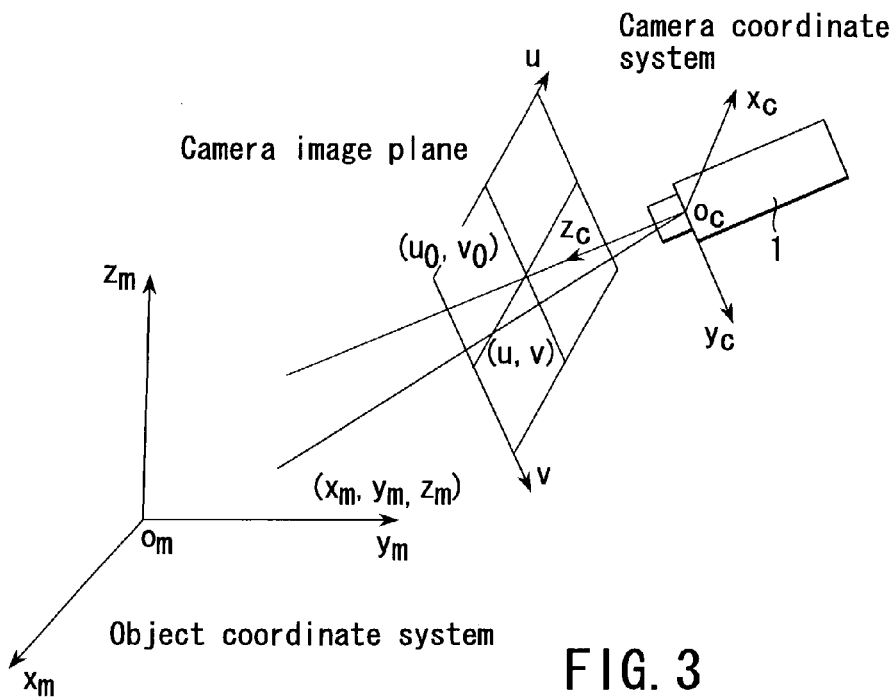
FIG. 3 is a diagram showing the relation between an object coordinate system, a camera ordinate system and a camera image plane.

A basic method of handling the image and the coordinate transformation will be explained. Basically, the three-dimensional model data 3 and the image input unit 1 each have a unique coordinate system. An image to be picked up by the image input unit 1 is defined as a camera image plane. FIG. 3 shows this relation. Assume that the object coordinate system defined by an object (three-dimensional model data 3) has an origin $O_m$ and a three-dimensional coordinate ($x_m$, $Y_m$, $Z_m$). The coordinate system defined by the image input unit 1, on the other hand, is assumed to have an origin $O_c$ and a three-dimensional coordinate ($x_c$, $y_c$, $z_c$). The camera image plane is configured of a u axis and a v axis. The u axis is taken in parallel to the $x_c$ axis of the camera coordinate system, and the v axis in parallel to the $y_c$ axis. The $z_c$ axis defining the camera coordinate system coincides with the optical axis of the optical system of the image input unit 1. The point where the optical axis and the camera image plane cross each other (center of the camera image plane) is defined as ($u_0$, $v_0$).

The problem of estimating the three-dimensional position/orientation of an object in opposed relation to the image input unit 1 leads to the problem of estimating the position/orientation of the object coordinate system relative to the camera coordinate system, i.e. the problem of calculating the coordinate transform parameter from the object coordinate system to the camera coordinate system or the coordinate transform parameter from the camera coordinate system to the object coordinate system. Utilizing the homogeneous transform matrix $_cH_m$ or $_mH_c$, this can be described arithmetically as follows:

$$\begin{bmatrix} x_c \\ y_c \\ z_c \\ 1 \end{bmatrix} = {_cH_c} \begin{bmatrix} x_m \\ y_m \\ z_m \\ 1 \end{bmatrix} = \begin{bmatrix} R & t \\ 0 & 1 \end{bmatrix} \begin{bmatrix} x_m \\ y_m \\ z_m \\ 1 \end{bmatrix} = \begin{bmatrix} r_{11} & r_{12} & r_{13} & t_x \\ r_{21} & r_{22} & r_{23} & t_x \\ r_{31} & r_{32} & r_{33} & t_x \\ 0 & 0 & 0 & 1 \end{bmatrix} \begin{bmatrix} x_m \\ y_m \\ z_m \\ 1 \end{bmatrix} \quad (1)$$

$$\begin{bmatrix} x_m \\ y_m \\ z_m \\ 1 \end{bmatrix} = {_cH_c} \begin{bmatrix} x_c \\ y_c \\ z_c \\ 1 \end{bmatrix} = \begin{bmatrix} R' & t' \\ 0 & 1 \end{bmatrix} \begin{bmatrix} x_c \\ y_c \\ z_c \\ 1 \end{bmatrix} = \begin{bmatrix} r'_{11} & r'_{12} & r'_{13} & t'_x \\ r'_{21} & r'_{22} & r'_{23} & t'_x \\ r'_{31} & r'_{32} & r'_{33} & t'_x \\ 0 & 0 & 0 & 1 \end{bmatrix} \begin{bmatrix} x_c \\ y_c \\ z_c \\ 1 \end{bmatrix} \quad (2)$$

where $R=(r_{ij})$, $R'=(r'_{ij})$ is the rotation matrix of 3×3, and $t=(t_x, t_y, t_z)$, $t'=(t'_x, t'_y, t'_z)$ is the three-dimensional translation vector.

The point group $\{M_i: i=1, 2, \ldots, m\}$ described below makes up a three-dimensional model data in the object coordinate system in advance and each point is expressed as $$(x_i^m, y_i^m, z_i^m).$$

Also, their positions in an image are described as ($u_i$, $v_i$). Then, in the case where the image input unit 1 is approximated by a pinhole camera model, the coordinates are related to each other as follows:

$$\begin{bmatrix} U_i \\ V_i \\ W_i \end{bmatrix} = \begin{bmatrix} \alpha_u & 0 & u_0 & 0 \\ 0 & \alpha_v & v_0 & 0 \\ 0 & 0 & 0 & 0 \end{bmatrix} {_cH_m} \begin{bmatrix} x_i^m \\ y_i^m \\ z_i^m \\ 1 \end{bmatrix} \quad (3)$$

$$u_i = \frac{U_i}{W_i} \quad v_i = \frac{V_i}{W_i} \quad (4)$$

where ($u_0$, $v_0$) indicates the center of the image. Also, ($\alpha_u$, $\alpha_v$) indicates the expansion rate in the directions u and v, which is an internal parameter of the camera for the image input unit 1. This is a value that can be estimated by the camera calibration.

Consider a case in which the view field of the camera is in the range of 640×480 pixels. The three-dimensional model data 3 is within the view field under the condition satisfying the relation $0<u_i<640$, $0<v_i<480$.

The time point when the user moves the image input unit 1 and captures the three-dimensional model data 3 in the view field thereof is associated with a case where $u_i$, $v_i$ satisfy the condition described above. At this time point, the operation of the dynamic deformation control unit 4 is started. Specifically, a time counting function (not shown) in the dynamic deformation control unit 4 starts counting the time, and in accordance with the time t indicated by the function, the three-dimensional model data 3 is deformed. The deformation is so varied that in the case where the three-dimensional model is a human being, for example, the upper limbs and the lower limbs thereof are each moved by t in the X direction. In accordance with this deformation, the two-dimensional position projected in the view field of the camera is also moved, with the result that the model image performs the operation dynamically in the view field of the camera. By moving the image input unit 1, the three-dimensional model under deformation, once caught in the view field, can be observed from an arbitrary direction.

In addition to the optical detection method using the marker described above, a method using any of various sensors including a magnetic sensor and a gyro sensor is apparently applicable as the position information management unit 2.

In this embodiment, the model deformation is performed in accordance with how long it has passed after the entry of the three-dimensional model into the view field. Nevertheless, the deformation may be accomplished on the basis of the position the image input unit 1 takes in the object coordinate system. Further, a random number may be generated in the system and the deformation of the model may be adjusted in accordance with the random number. Alternatively, the deformation may be controlled in accordance with an operation performed by the manager in charge of controlling the entire system (or the so-called "server manager.") The manager can, of course, control the system by using the control program prepared for the system, thereby to accomplish the above-mentioned deformation of the model. Thus, the "operation performed by the manager" includes such a program-based control of the system.

Moreover, the deformation of the model may be carried as the user who holds the image input unit 1 consciously performs an operation. This operation is, for example, to move the camera, change the orientation thereof, or push a button.

Figure 4:
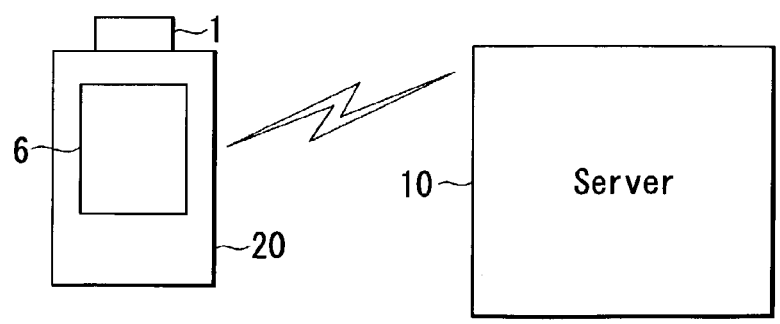
FIG. 4 is a diagram showing an information display system configured as a server-client system according to the first embodiment of the invention.

Also, the information display system according to this embodiment can be provided as a single apparatus, as described below. As shown in FIG. 4, the system can be provided as a server 10 and a client communicable with each other directly by radio or cable or through a network such as an Internet. In the latter case, the client is preferably configured as a portable information terminal 20 such as a compact, lightweight PDA or a personal computer. In such a case, the image input unit 1 is a camera included in the portable information terminal 20 or connected to the portable information terminal 20. The information superposed display unit 6 is a display included in the portable information terminal 20. A single server 10 can of course serve a plurality of clients.

(1) The image input unit 1 and the information superposed display unit 6 are included in the client (portable information terminal 20), and the position information management unit 2, the three-dimensional model data 3, the dynamic deformation control unit 4 and the model data two-dimensional projection image generating unit 5 are included in the server 10. Specifically, the client (portable information terminal 20) sends an input image to the server 10, which in turn performs all the processes from the marker detection to the generation of a two-dimensional projection image. The two-dimensional projection image thus generated is sent to the client (portable information terminal 20) and displayed in superposed relation with the input image. Therefore, this configuration is preferably used in an application where the processing function of the client (portable information terminal 20) is very low and the load of the serve 10 is light.

(2) The image input unit 1, the maker detection unit 2A of the position information management unit 2 and the information superposed display unit 6 are included in the client (portable information terminal 20), and the server 10 includes the marker recognition unit 2B of the position information management unit 2, the three-dimensional model data 3, the dynamic deformation control unit 4 and the model data two-dimensional projection image generating unit 5. Specifically, the client searches the image for a part corresponding to the marker, and sends the particular part of the image to the server 10. The server 10 performs the process from the marker analysis to the generation of the two-dimensional projection image. The two-dimensional projection image thus generated is sent to the client (portable information terminal 20) and displayed in superposed relation with the input image. Thus, only the screen corresponding to the marker is sent to the server 10, and therefore the amount of the transfer data is reduced as compared with (1) above.

(3) The image input unit 1, the position information management unit 2 and the information superposed display unit 6 are included in the client (portable information terminal 20), and the server 10 includes the three-dimensional model data 3, the dynamic deformation control unit 4 and the model data two-dimensional projection image generating unit 5. In view of the fact that the marker detection and recognition are carried out by the client (portable information terminal 20), the amount of the data transferred to the server 10 is further reduced as compared with the case of (2) above. Also, the processing is possible even under a heavy load in such a case where the server 10 has a multiplicity of clients.

(4) The image input unit 1, the position information management unit 2, the model data two-dimensional projection image generating unit 5 and the information superposed display unit 6 are included in the client (portable information terminal 20), and the server 10 includes the three-dimensional model data 3 and the dynamic deformation control unit 4. The detection and recognition of the marker is accomplished by the client (portable information terminal 20), while the server 10 dynamically controls the three-dimensional model and sends the deformed three-dimensional data to the client (portable information terminal 20). The client (portable information terminal 20) renders the three-dimensional data two-dimensionally in accordance with the view point of the client (portable information terminal 20), and displays it in superposition. Specifically, as far as the processing ability of the client (portable information terminal 20) is high, the load on the client (portable information terminal 20) and the server 10 can be appropriately adjusted.

(5) The image input unit 1, the position information management unit 2, the three-dimensional model data 3, the model data two-dimensional projection image generating unit 5 and the information superposed display unit 6 are included in the client (portable information terminal 20), and the server 10 includes the dynamic deformation control unit 4. All the processes other than the dynamic deformation of the three-dimensional model data is performed by the client (portable information terminal 20). Specifically, only the information on the dynamic deformation (movement by Y mm along X axis with time, for example) is generated by the server 10, and the rendering and display are performed using the particular information in the client (portable information terminal 20). This method is effective in the case where the client (portable information terminal 20) has a sufficient ability and the server 10 is desirous of sending similar dynamic deformation information to a plurality of clients.

(6) A stand-alone type in which the entire processes are performed by the client (portable information terminal 20).

SECOND EMBODIMENT

Figure 5:
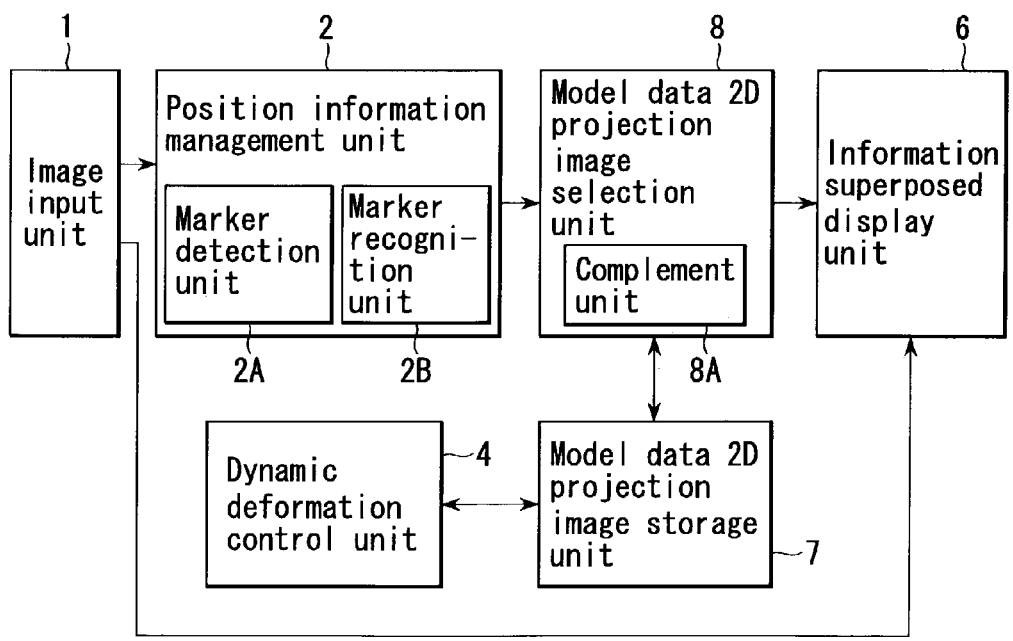
FIG. 5 is a block diagram showing a configuration of an information display system according to a second embodiment of the invention.

Next, a second embodiment of the invention will be explained. According to the second embodiment, a two-dimensional projection image of three-dimensional model data is generated and stored in advance from a view point of a camera. Specifically, as shown in FIG. 5, an information display system according to this embodiment comprises an image input unit 1, a position information management unit 2, an information superposed display unit 6, a model data two-dimensional projection image storage unit 7 and a model data two-dimensional projection image selection unit 8. These component parts can of course be configured dividedly between a client (portable information terminal 20) and a server 10 appropriately as in the first embodiment.

The image input unit 1, the position information management unit 2 and the information superposed display unit 6 are similar to the corresponding ones in the first embodiment. The model data two-dimensional projection image storage unit 7 has stored therein dynamic two-dimensional projection image data from several position/orientations (called the representative points) of the image input unit 1, which are prepared in advance. The model data two-dimensional projection image selection unit 8 selects the dynamic two-dimensional projection image data stored in the model data two-dimensional projection image storage unit 7.

In the information display system having this configuration, the dynamic two-dimensional projection image data at the representative point spatially nearest to the present position $(X_t, Y_t, Z_t)$ is used for actual movement of the image input unit 1. Specifically, assuming that the coordinate of the representative point is given as $(X_r, Y_r, Z_r)$, the representative point minimizing the value L in the equation:

$$L=[(X_r-X_t)^2+(Y_r-Y_t)^2+(Z_r-Z_t)^2]^{1/2}$$

is selected by the model data two-dimensional projection image selection unit 8 thereby to read the dynamic two-dimensional projection image data with a view point as the representative point which is stored in the model data two-dimensional projection image storage unit 7. By doing so, the means requiring a high processing capability such as the model data two-dimensional projection image generating unit 5 in the first embodiment is no longer necessary. Even with a client (portable information terminal 20) or the server 10 having not so high a processing capability, therefore, the function of the overall system can be exhibited without reducing the processing capability thereof.

When there are not may representative points, a complement unit 8 A is configured in the model data two-dimensional projection image selection unit 8, so that the weighted average of the dynamic two-dimensional projection image data at the neighboring four representative points can be used as a complement according to the position of the image input unit 1. Further, the dynamic two-dimensional projection image data generated in advance and stored in the model data two-dimensional projection image storage unit 7 may be used by being deformed by the dynamic deformation control unit 4.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information display system comprising:
    an image input unit configured to input an image;
    a position information management unit configured to estimate position/orientation information of the image input unit in an object coordinate system, from the image input by the image input unit;
    a three-dimensional model data arranged in the object coordinate system;
    a dynamic deformation control unit configured to dynamically control the deformation of the three-dimensional model data;
    a two-dimensional projection image generating unit configured to generate, based on the position/orientation information of the image input unit estimated by the position information management unit, a two-dimensional projection image data in a view field of the image input unit for the three-dimensional model data deformation-controlled by the dynamic deformation control unit; and
    a superposed display unit configured to display, in superposed relation with the input image from the image input unit, the two-dimensional projection image data generated by the two-dimensional projection image generating unit.

2. An information display system according to claim 1, wherein
    the image input unit and the superposed display unit are included in a portable information terminal; and
    the position information management unit, the three-dimensional model data, the dynamic deformation control unit and the two-dimensional projection image generating unit are included in a server communicable with the portable information terminal.

3. An information display system according to claim 1, wherein
    the position information management unit includes:
        a marker detection unit configured to detect a known marker existing in an image input by the image input unit; and
        a position/orientation relation calculation unit configured to estimate the position/orientation information of the image input unit in the object coordinate system by calculating the relative positions/orientations of the known marker detected by the marker detection unit and the image input unit, the image input unit, the marker detection unit of the position information management unit and the superposed display unit are included in the portable information terminal, and the position/orientation relation calculation unit of the position information management unit, the three-dimensional model data, the dynamic deformation control unit and the two-dimensional projection image generating unit are included in a server communicable with the portable information terminal.

4. An information display system according to claim 1, wherein the image input unit, the position information management unit and the superposed display unit are included in the portable information terminal, and the three-dimensional model data, the dynamic deformation control unit and the two-dimensional projection image generating unit are included in a server communicable with the portable information terminal.

5. An information display system according to claim 1, wherein the image input unit, the position information management unit, the two-dimensional projection image generating unit and the superposed display unit are included in a portable information terminal, and the three-dimensional model data and the dynamic deformation control unit are included in a server communicable with the portable information terminal.

6. An information display system according to claim 1, wherein the image input unit, the position information management unit, the three-dimensional model data, the two-dimensional projection image generating unit, the dynamic deformation control unit and the superposed display unit are included in a portable information terminal, and control information for controlling the dynamic deformation control unit is transmitted by a server communicable with the portable information terminal.

7. An information display system according to claim 1, wherein the dynamic deformation of the three-dimensional model data is controlled in accordance with the time relative to a reference time point.

8. An information display system according to claim 1, wherein the dynamic deformation of the three-dimensional model data is controlled in accordance with the position/orientation of the image input unit.

9. An information display system according to claim 1, wherein the dynamic deformation of the three-dimensional model data is controlled in accordance with the random number generated by a random number generator.

10. An information display system according to claim 1, wherein the dynamic deformation of the three-dimensional model data is controlled in accordance with an operation performed by a person in charge of controlling the information display system.

11. An information display system according to claim 1, wherein the dynamic deformation of the three-dimensional model data is controlled in accordance with an operation consciously performed by a user holding the image input unit.

12. A portable information terminal comprising:

an image input unit configured to input an image and transmit the input image to a server;

a superposed display unit configured to receive from the server two-dimensional projection image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on position/orientation information of the image input unit in the object coordinate system estimated from the image input by the image input unit.

13. A portable information terminal according to claim 12, wherein the dynamic deformation of the three-dimensional model data is controlled in accordance with the time relative to a reference time point.

14. A portable information terminal according to claim 12, wherein the dynamic deformation of the three-dimensional model data is controlled in accordance with the position/orientation of the image input unit.

15. A portable information terminal according to claim 12, wherein the dynamic deformation of the three-dimensional model data is controlled in accordance with the random number generated by a random number generator.

16. A portable information terminal according to claim 12, wherein the dynamic deformation of the three-dimensional model data is controlled in accordance with an operation performed by a person in charge of controlling the server.

17. A portable information terminal according to claim 12, wherein the dynamic deformation of the three-dimensional model data is controlled in accordance with an operation consciously performed by a user holding the image input unit.

18. A portable information terminal comprising:

an image input unit configured to input an image;

a marker detection unit configured to detect a known marker existing in an image input by the image input unit and transmit a part of the image corresponding to the detected known marker in the input image to a server; and a superposed display unit configured to receive from the server two-dimensional projection image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on position/orientation information of the image input unit in the object coordinate system estimated from the image transmitted by the marker detection unit.

19. A portable information terminal comprising:

an image input unit configured to input an image;

a position information management unit configured to estimate position/orientation information of the image input unit in an object coordinate system from the image input by the image input unit, and to transmit the estimated position/orientation information to a server; and a superposed display unit configured to receive from the server two-dimensional image data, in a view field of the image input unit, of model data resulting from the dynamic deformation control of three-dimensional model data arranged in an object coordinate system, and to display the two-dimensional projection image data in superposed relation with the image input by the image input unit, the three-dimensional model data being generated based on the position/orientation information transmitted by the position information management unit.

20. A portable information terminal comprising:
an image input unit configured to input an image;
a position information management unit configured to estimate position/orientation information of the image input unit in an object coordinate system from the image input by the image input unit;
a two-dimensional projection image generating unit configured to receive from a server three-dimensional model data resulting from the dynamic deformation control of three-dimensional model data arranged in the object coordinate system, and to generate two-dimensional projection image data of the received three-dimensional model data in a view field of the image input unit, based on the position/orientation information of the image input unit estimated by the position information management unit; and
a superposed display unit configured to display the two-dimensional projection image data generated by the two-dimensional projection image generating unit, in superposed relation with the image input by the image input unit.

21. A portable information terminal comprising:
an image input unit configured to input an image;
a position information management unit configured to estimate position/orientation information of the image input unit in an object coordinate system from the image input by the image input unit;
three-dimensional model data arranged in the object coordinate system;
a two-dimensional projection image generating unit configured to receive from a server deformation control information for controlling the deformation of the three-dimensional model data dynamically, and to generate two-dimensional projection image data, in a view field of the image input unit, of the three-dimensional model data deformation-controlled in accordance with the deformation control information, based on the position/orientation information of the image input unit estimated by the position information management unit; and
a superposed display unit configured to display the two-dimensional projection image data generated by the two-dimensional projection image generating unit, in superposed relation with the image input by the image input unit.

22. A portable information terminal comprising:
an image input unit configured to input an image;
a position information management unit configured to estimate position/orientation information of the image input unit in an object coordinate system from the image input by the image input unit;
three-dimensional model data arranged in the object coordinate system;
a dynamic deformation control unit configured to control the deformation of the three-dimensional model data dynamically;
a two-dimensional projection image generating unit configured to generate two-dimensional projection image data, in a view field of the image input unit, of the three-dimensional model data deformation-controlled by the dynamic deformation control unit, based on the position/orientation information of the image input unit estimated by the position information management unit; and
a superposed display unit configured to display the two-dimensional projection image data generated by the two-dimensional projection image generating unit, in superposed relation with the image input by the image input unit.

23. An information display system comprising:
an image input unit configured to input an image;
a position information management unit configured to estimate position/orientation information of the image input unit in an object coordinate system from the image input by the image input unit;
a two-dimensional projection image storage unit configured to store dynamic two-dimensional projection image data from a plurality of view points prepared in advance;
a two-dimensional projection image selection unit configured to select the dynamic two-dimensional projection image data stored in the dynamic two-dimensional projection image storage unit, based on the position/orientation information of the image input unit estimated by the position information management unit; and
a superposed display unit configured to display the dynamic two-dimensional projection image data selected by the two-dimensional projection image selection unit, in superposed relation with the image input by the image input unit.

24. An information display system according to claim 23, wherein
the image input unit and the superposed display unit are included in a portable information terminal, and
the position information management unit, the dynamic two-dimensional projection image storage unit and the two-dimensional projection image selection unit are included in a server communicable with the portable information terminal.

25. An information display system according to claim 23, wherein
the position information management unit includes:
a marker detection unit configured to detect a known marker existing in the image input by the image input unit; and
a position/orientation relation calculation unit configured to estimate the position/orientation information of the image input unit in the object coordinate system by calculating the relative positions/orientations of the known marker detected by the marker detection unit and the image input unit,
the image input unit, the marker detection unit of the position information management unit and the superposed display unit are included in a portable information terminal, and
the relative position/orientation calculation unit of the position information management unit, the dynamic two-dimensional projection image storage unit and the two-dimensional projection image selection unit are included in a server communicable with the portable information terminal.

26. An information display system according to claim 23, wherein
the image input unit, the position information management unit and the superposed display unit are included in a portable information terminal, and
the dynamic two-dimensional projection image storage unit and the two-dimensional projection image selection unit are included in a server communicable with the portable information terminal.

27. An information display system according to claim 23, wherein
- the image input unit, the position information management unit, the two-dimensional projection image selection unit and the superposed display unit are included in a portable information terminal, and
- the dynamic two-dimensional projection image storage unit is included in a server communicable with the portable information terminal.

28. An information display system according to claim 23, wherein the selected two-dimensional projection image data is complemented in accordance with the position/orientation information of the image input unit based on the two-dimensional projection image data from a plurality of view points other than the selected two-dimensional projection image data.

29. A portable information terminal comprising:
- an image input unit configured to input an image and transmit the input image to a server; and
- a superposed display unit configured to receive from the sever dynamic two-dimensional projection image data and display the dynamic two-dimensional projection image data in superposed relation with the image input by the image input unit, the dynamic two-dimensional projection image data being selected based on position/orientation information of the image input unit in an object coordinate system estimated from the input image among dynamic two-dimensional projection image data from a plurality of view points prepared in advance.

30. A portable information terminal according to claim 29, wherein the selected two-dimensional projection image data is complemented in accordance with the position/orientation information of the image input unit based on the two-dimensional projection image data from a plurality of view points other than the selected two-dimensional projection image data.

31. A portable information terminal comprising:
- an image input unit configured to input an image;
- a marker detection unit configured to detect a known marker existing in an image input by the image input unit and transmit to a server a part of the image corresponding to the detected known marker in the input image; and
- a superposed display unit configured to receive from the sever dynamic two-dimensional projection image data and display the dynamic two-dimensional projection image data in superposed relation with the image input by the image input unit, the dynamic two-dimensional projection image data being selected based on position/orientation information of the image input unit in an object coordinate system estimated from the image transmitted by the marker detection unit among dynamic two-dimensional projection image data from a plurality of view points prepared in advance.

32. A portable information terminal comprising:
- an image input unit configured to input an image;
- a position information management unit configured to estimate position/orientation information of the image input unit in an object coordinate system from the image input by the image input unit, and to transmit the estimated position/orientation information to a server; and
- a superposed display unit configured to receive from the sever dynamic two-dimensional projection image data and display the dynamic two-dimensional projection image data in superposed relation with the image input by the image input unit, the dynamic two-dimensional projection image data being selected based on the position/orientation information transmitted from the position information management unit among dynamic two-dimensional projection image data from a plurality of view points prepared in advance.

33. A portable information terminal comprising:
- an image input unit configured to input an image;
- a position information management unit configured to estimate position/orientation information of the image input unit in an object coordinate system from the image input by the image input unit;
- a two-dimensional projection image selection unit configured to communicate with a server and select one of dynamic two-dimensional projection image data from a plurality of view points prepared in advance and stored in the server, based on the position/orientation information of the image input unit estimated by the position information management unit; and
- a superposed display unit configured to display the dynamic two-dimensional projection image data selected by the two-dimensional projection image selection unit, in superposed relation with the image input by the image input unit.

34. A portable information terminal comprising:
- an image input unit configured to input an image;
- a position information management unit configured to estimate position/orientation information of the image input unit in an object coordinate system from the image input by the image input unit;
- a dynamic two-dimensional projection image storage unit configured to store dynamic two-dimensional projection image data from a plurality of view points prepared in advance;
- a two-dimensional projection image selection unit configured to select the dynamic two-dimensional projection image data stored in the dynamic two-dimensional projection image storage unit, based on the position/orientation information of the image input unit estimated by the position information management unit; and
- a superposed display unit configured to display the dynamic two-dimensional projection image data selected by the two-dimensional projection image selection unit, in superposed relation with the image input by the image input unit.

* * * * *